United States Patent [19]

Loebig

[11] Patent Number: 5,406,563
[45] Date of Patent: Apr. 11, 1995

[54] METHOD FOR ERROR DETECTION IN DIGITAL COMMUNICATION SYSTEMS

[75] Inventor: Norbert Loebig, Darmstadt, Germany

[73] Assignee: Siemens Aktiengesellschaft, Munich, Germany

[21] Appl. No.: 103,093

[22] Filed: Aug. 6, 1993

[30] Foreign Application Priority Data

Aug. 11, 1992 [DE] Germany ................ 42 26 599.1

[51] Int. Cl.⁶ .............................................. G06F 15/20
[52] U.S. Cl. ....................................... 371/5.1; 370/13; 370/14
[58] Field of Search ................... 370/13, 14; 371/5.1, 371/20.1

[56] References Cited

U.S. PATENT DOCUMENTS

| | | | |
|---|---|---|---|
| Re. 30,187 | 1/1980 | Hong et al. | 371/37.7 |
| 3,916,379 | 10/1975 | Dulaney et al. | 371/5.1 |
| 4,091,239 | 5/1978 | Lainey et al. | 370/13 |
| 4,091,240 | 5/1978 | Lainey et al. | 370/13 |
| 4,291,403 | 9/1981 | Waddill et al. | 371/5.1 |
| 5,268,909 | 12/1993 | Loebig | 370/13 X |
| 5,323,421 | 6/1994 | LaRosa et al. | 371/5.1 X |

OTHER PUBLICATIONS

"Taschenbuch Der Nachrichten–Verarbeitung" by Dr.–Ing. K. Steinbuch, 1962, pp. 84–101, 150–159.

*Primary Examiner*—Edward R. Cosimano
*Attorney, Agent, or Firm*—Hill, Steadman & Simpson

[57] ABSTRACT

Bit falsifications in the form of wrong through-connections of bit streams composed of a plurality of information words occur in the switching networks of digital communication systems. In order to discover and eliminate these wrong through-connections, checks in the form of co-transmission monitoring are disclosed. On the basis of a designational, channel-by-channel check of the respective information words, one can thus identify whether the error is also present over a longer time span. When this is the case, the corresponding connection is aborted and error treatment measures are initiated.

7 Claims, 5 Drawing Sheets

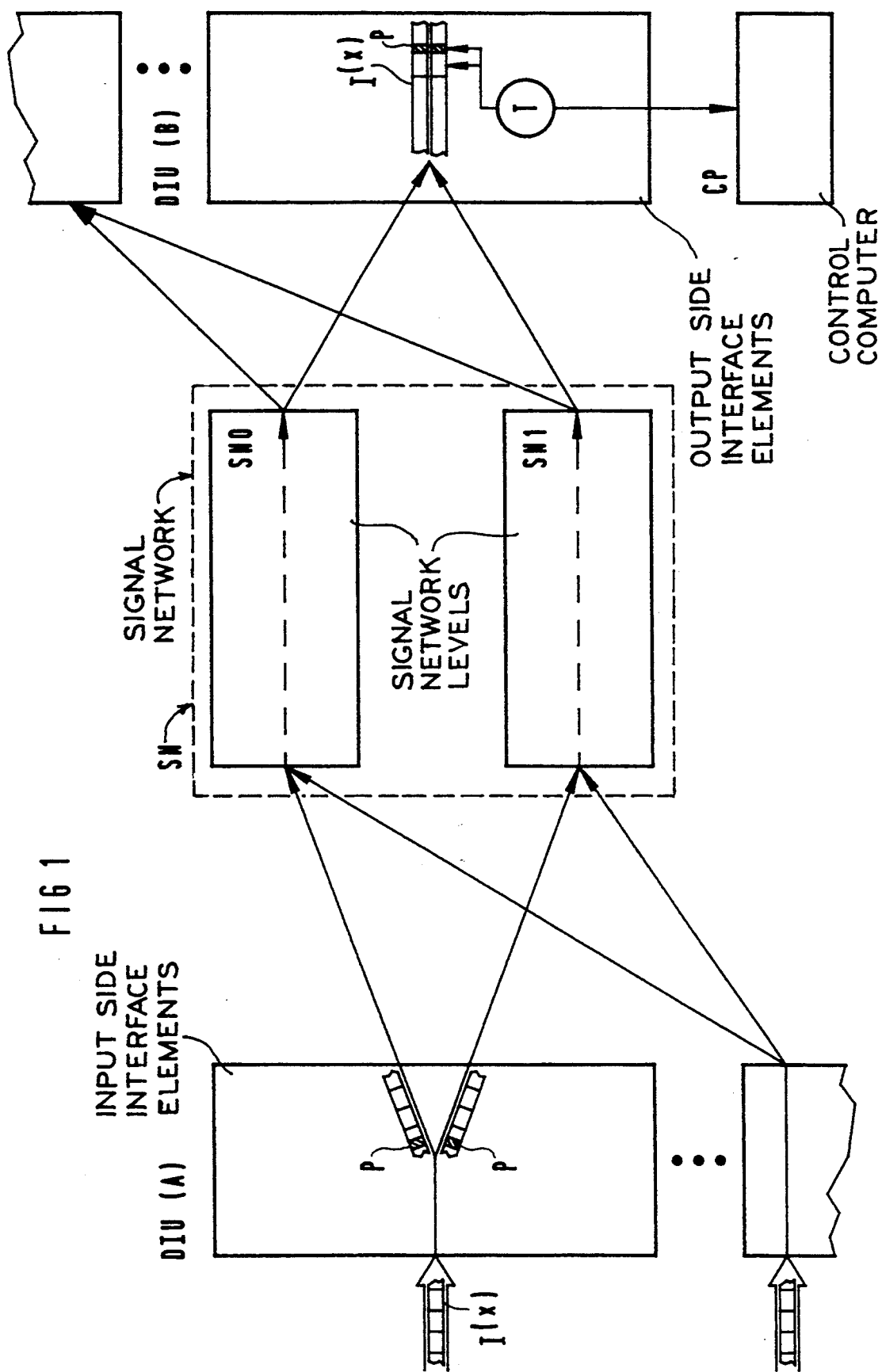

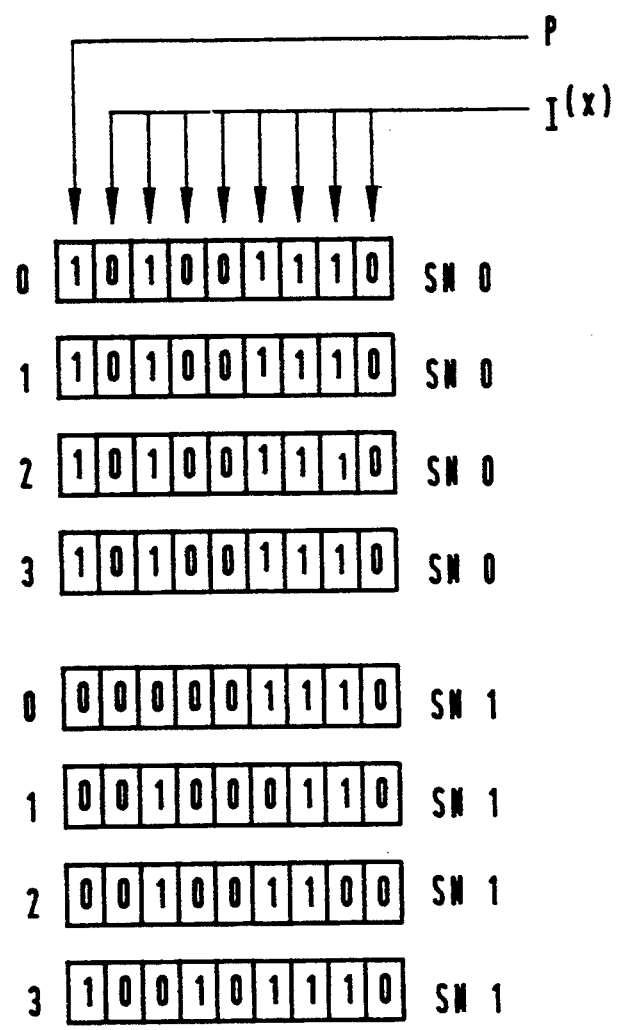

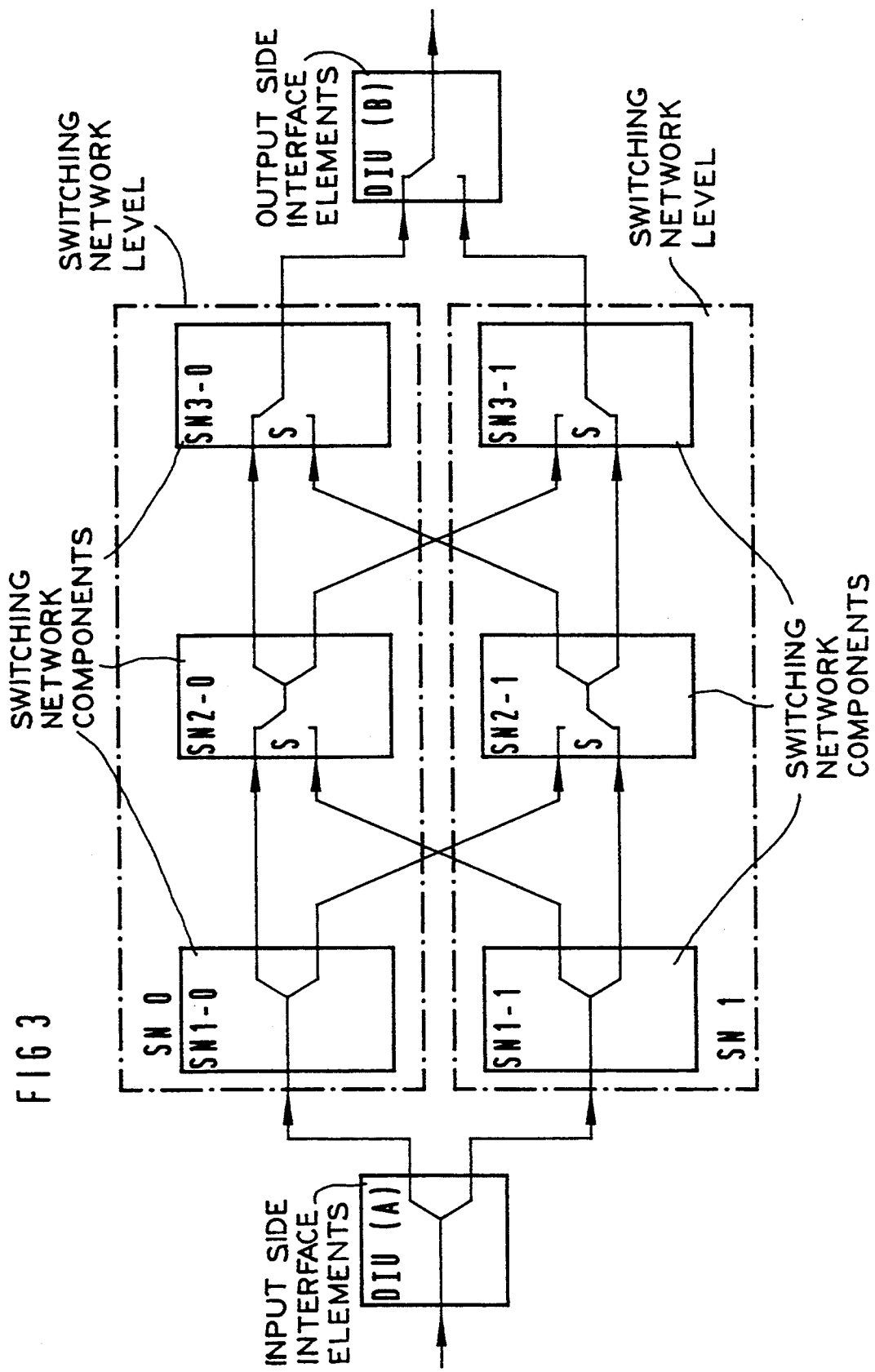

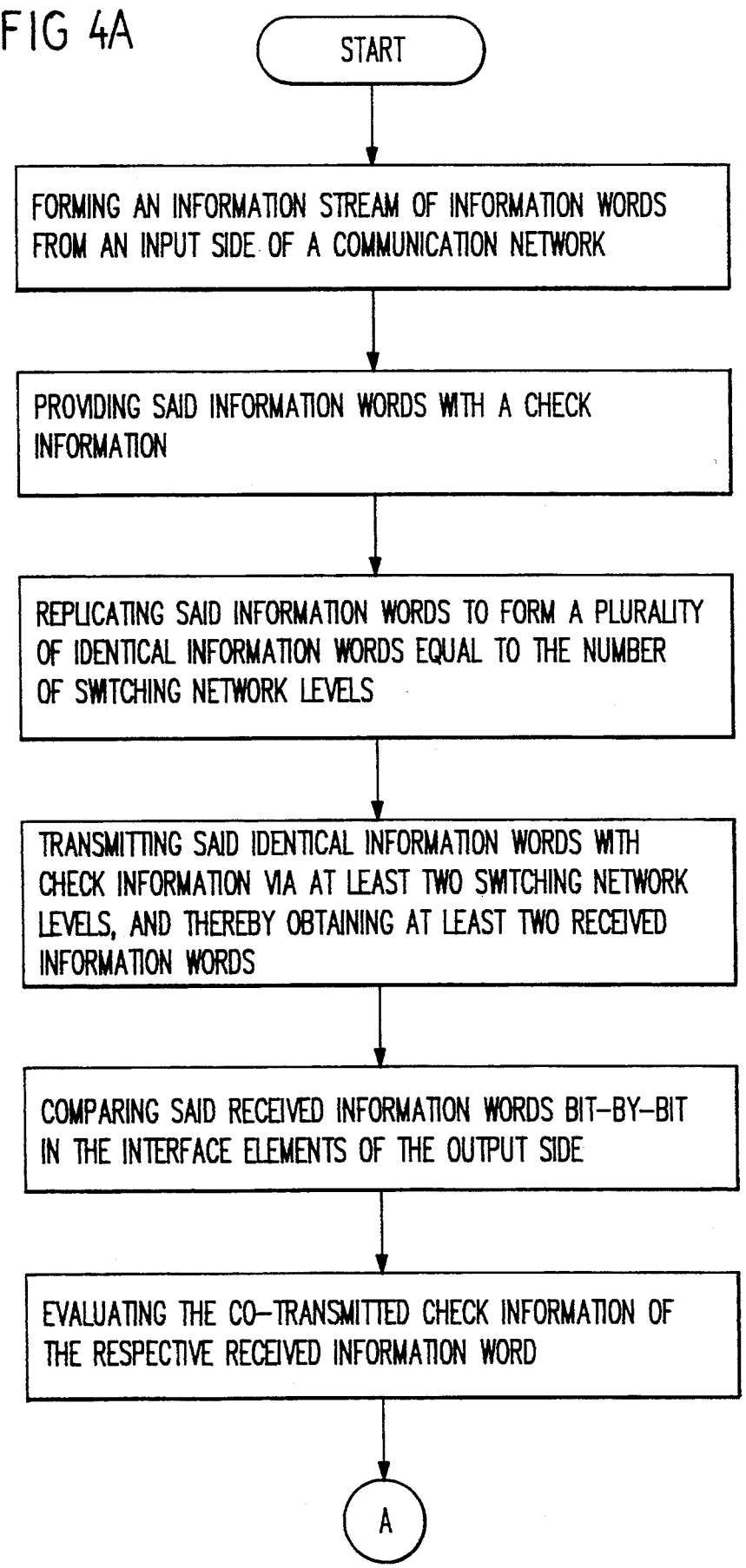

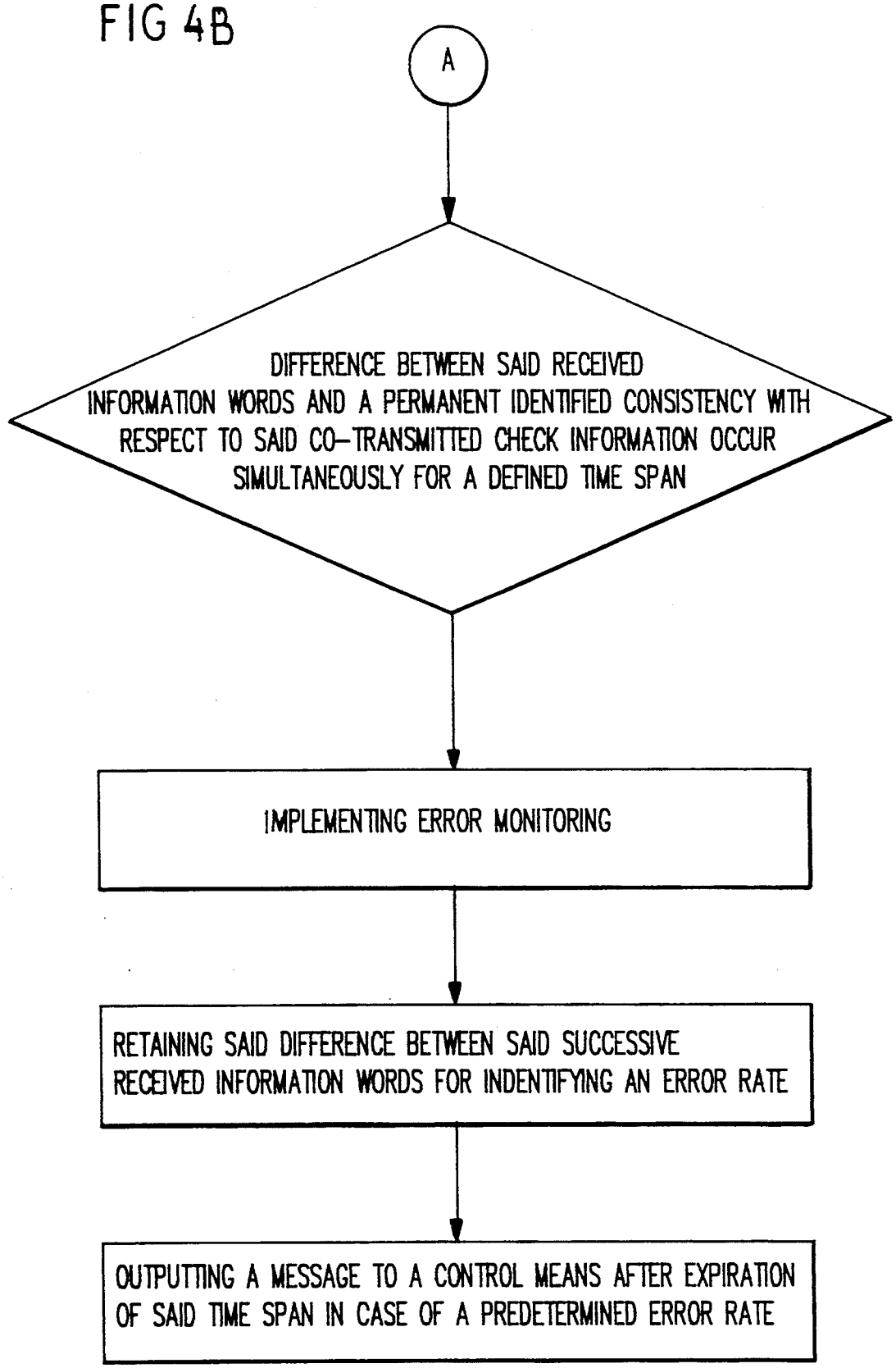

METHOD FOR ERROR DETECTION IN DIGITAL COMMUNICATION SYSTEMS

BACKGROUND OF THE INVENTION

1. Field of the Invention

The present invention is directed to a method for error detection in digital communication systems having a communication network with switching networks.

2. Description of the Prior Art and Related Material

Analog and digital data transmitted on lines and cables are exposed to disturbing influences, i.e. electromagnetic fields. These disturbing influences modify the information to be transmitted; for example, bits are often "turned around" during the transmission. Since international long distance connections are particularly susceptible to bit errors, international standardization authorities such as CCITT have defined minimum prescriptions for bit error rates. Optical transmission links are considerably less subject to external influences, thus yielding extremely high transmission reliability.

In general, every transmission link is composed of two parts. One part relates to the transmission of information via a physical path between two nodes. Optical communication cables are increasingly being used for this part. A further part relates to the through-connection of the information in the nodes.

The potential disturbing influences in the transmission oriented part have been decisively reduced by using optical transmission systems. In comparison, bit errors frequently occur in the switching networks of the communication system during the through-connection events.

Due to their crucial significance for the communication systems, the switching networks usually incorporate double or triple redundancy. Redundancy makes it possible to through-connect the information over a number of switching network levels when a malfunction appears on the primary switching network level. One way this can be done is by having one switching network level in a quiescent (standby) condition, whereas the other switching network level carries out the active through-connection of the information. Another way to accomplish this is to have both switching network levels actively through-connect the corresponding information.

Bit falsifications during the through-connection of the bit stream are an additional problem in the art. They are caused by the aging of individual components. Such errors are difficult to analyze and eliminate.

An example of error detection methods for recognizing and correcting bit errors is disclosed in German patent application P 41 28 412.7. The application discloses a method wherein, before the actual through-connect event in the switching network occurs, the information words are duplicated and an additional check information such as, for example, a parity bit is attached to every information word. An information word is usually composed of eight bits. Also a parity bit is generally understood to be the binary checksum over the individual bits of an information word. The information words of a channel supplemented by their check information are thereby transmitted between interface elements and switching network elements in a time-division multiplexing method. An uneven parity bit, meaning the inverted binary checksum of a information word, is preferably also attached. The duplicated information words are each conducted via a switching network level and are recombined after the through-connect event. Subsequently, a binary checksum of the through-connected information word is again calculated and compared to the co-transmitted parity bit. When the co-transmitted parity bit and the newly calculated parity bit deviate from one another, there is a transmission error. Additionally, after the through-connect event, the two information words allocated to one another are compared to one another bit-by-bit. The bit-by-bit comparison combination with an evaluation of the co-transmitted parity bit allows an unambiguous statement in most instances regarding whether that information was correctly through-connected. When a transmission error is identified, it is retained in a corresponding table memory via a statistical function. Conclusions about the condition of the corresponding switching network level can thus be made over defined time spans. These conclusions are of a purely statistical nature and, in particular, are utilized when the bit-by-bit comparison in combination with the evaluation of the parity bit does not supply unambiguous results. When this is the case, that switching network level that exhibited the lowest bit error rate in the past can preferably be employed for the through-connection of the bit streams.

The problem in this method, however, is that an incorrect through-connection through a switching network level causes a permanent difference of the respective information words in the bit-by-bit comparison, even through a correct transmission was identified on the basis of the co-transmitted parity bits in every switching network level. Since the statistical quality data were accessed in the proposed method, the table memory is falsified given an existing, permanent wrong through-connection.

SUMMARY OF THE INVENTION

It is an object of the invention to recognize errors that are based on a permanent wrong connection through the switching network and to potentially minimize their effects. The above object is achieved in accordance with the principles of the present invention in a method for error detection in digital communication systems (KS), comprising a communication network having a switching network (SN) with at least two switching network levels (SN0, SN1) incorporated into the communication network via interface elements DIU(A) of the input side and DIU (B) of the output side. Information words ($I^{(O)}$ ... $I^{(N)}$) incoming in via the communication network and forming an information stream are provided with a check information (P) in the interface elements DIU(A) of the input side and are duplicated in accordance with the number of switching network levels, and are transmitted via at least two switching network levels (SN0, SN1). Also, the information words through-connected via at least two switching network levels are subjected, first, to a bit-by-bit comparison at the interface elements DIU(B) of the output side, and second, to an evaluation of the co-transmitted check information (P). When there is a difference between the information words through-connected via at least two switching network levels and a permanent consistency identified at the same time in view of their co-transmitted check information (P) for a defined time span, an error monitoring is implemented within which the difference between the successive information words is retained for identifying an error rate and a message is output to a control means (CP) at least after the expiration of the time span in the case of a specific, excessively high error rate.

An advantage of the present invention is that wrong through-connections in a switching network level can be recognized very quickly and without great control outlay. Thus, not only are individual transmission errors recognized and eliminated, but also wrong connections between two subscribers are recognized. Further, sporadically occurring errors do not lead to erroneous recognitions of a faulty through-connection. For example, in the case of a recognition of a faulty through-connection through a switching network level, a central control means can abort the respective connection and initiate procedures for error detection. The timer procedure defining the time span for the verification of error is dependent on the respective transmission speed. This timer procedure can thereby be realized in terms of hardware or software. Moreover, the present method is effective for identification of incorrectly through-connected channels whereby errors are localized and treated. Also, a co-transmitted monitoring of the correct through-connection occurs over the entire duration of an arbitrary connection, i.e. not just at the time of the call setup.

In asynchronously set switching networks, the two switching network levels are set at different times after evaluation of the signaling information. Thus, a further protective time must be used so that a potential discrepancy between the information stream through-connected via the switching network levels for the time of the setting event does not lead to the erroneous recognition of a faulty through-connection.

The method of the present invention is further effectively applied to the switching network components that form the switching network. The present invention thus has the advantage that potentially occurring errors are already recognized, more precisely localized and eliminated in the switching networks.

BRIEF DESCRIPTION OF THE DRAWINGS

The invention shall be set forth in greater detail by way of example with reference to the figures.

FIG. 1 is a communication system with the corresponding interface elements of the input side and output side, as well as with a redundantly implemented switching network.

FIG. 2 is an example of the recognition of the wrong through-connection in the case of an asynchronously set, redundant switching network.

FIG. 3 is a multi-stage switching network composed of a plurality of switching network components.

FIG. 4A is a flowchart of the method of the present invention.

FIG. 4B is a continuation of the flowchart of FIG. 4A.

DESCRIPTION OF THE PREFERRED EMBODIMENTS

FIG. 1 discloses an embodiment of the present invention. Interface elements DIU(A) of the input side represent the interface to a communication network. The information streams coming from the information network comprising a plurality of information words $I^{(O)}$. . . $I^{(N)}$ are split into two identical streams. Also, an uneven parity bit P forming the binary checksum is attached to every information word $I^{(X)}$. Every information stream is conducted via a separate switching network level SN0, SN1. The through-connected information streams come together again in the interface elements DIU(B) of the output side. The through-connected information words are then checked here in a first evaluation with respect to the consistency of their co-transmitted, uneven parity bit. When an information word is consistent with respect to its co-transmitted, uneven parity bit P, there is still also the possibility that 2, 4, etc. bits were turned around during the transmission event. This has no influence whatsoever on the consistency of the through-connected information with respect to its uneven parity bit P. In a second evaluation, a bit-by-bit comparison of the respective information words $I^{(X)}$ is implemented channel-by-channel.

When the case arises that a through-connected information word is in fact consistent with respect to its co-transmitted, uneven parity bit P, but the allocated information words are different with respect to their bit positions, a timer procedure T commences. This timer procedure particularly serves the purpose of more closely investigating the information words following in the same channel. During the time span defined by the timer procedure T, the first and second evaluations continue to be implemented in the channel.

When the case arises that an inconsistency of an information word is identified in view of its uneven parity bit P, then it can be assumed that the transmission involves a sporadic error. In this case, the timer procedure T is aborted. When further discrepancies in consistency occur in this channel during the time spent, then it must be assumed that a wrong through-connection is present in one of the switching network levels SN0, SN1. In order to be able to make a reliable statement about this, the next $K_1$ information words transmitted, beginning with the first occurring error, should be investigated. When a difference of the respective information words brought in via the two switching network levels have been identified, for example $K_2$ ($< K_1$) information words, it must be assumed that the through-connection error existed in one of the switching network levels SN0, SN1. When this occurs, a message is sent to the central control computer CP. The central control means then aborts the connection and starts procedures for error detection.

The above method described is effective for synchronously set switching networks. In practice, however, asynchronously set switching networks SN also occur. FIG. 2 shows these conditions. Asynchronously set switching network levels are set at absolutely the same time. Thus, a single bit discrepancy is not identified between the participating switching network levels despite the setting event. This means that two asynchronously set switching network levels SN0, SN1 are not exactly isochronically set under certain circumstances. In this case, of course, it must be assumed that a bit-by-bit comparison during the duration of the setting event identifies the difference of the respective information words. A protective time that is characteristic for the setting event is therefore set and discrepancies of the information streams that potentially occur therein are not taken into consideration. The first and second evaluations are implemented as set forth above when this protective time has expired.

FIG. 2 describes the conditions as immediately set forth above. For purposes of clarity, it is assumed that the time of procedure T covers only four information words. It is also assumed that the through-connection speed is 64 Kbit/s. As shown in FIG. 2, the information words 0, 1, 2 supplied via both switching network levels are different but consistent with respect to the co-transmitted, uneven parity bit P. Since this example involves asynchronously set switching networks, first a wait for a protective time of 250 μsec transpires for bridging the asynchronous setting phase. Further, the time procedure T is set with a time span of 125 μsec. A permanent through-connect error is thus only recognized after the third frame for a 64 Kbit/s connection. In this case a message is then implemented to the control computer CP. Countermeasures for a more exact error localization are then initiated.

The method of the present invention can be effectively applied to triply implemented switching networks. In this embodiment, the information words $I^{(x)}$ supplemented by their check information are triplicated before the through-connect event. Thereafter the respective information words $I^{(x)}$ are connected via the respective switching network level and are subsequently connected together in the interface elements DIU(B) of the output side. The bit-by-bit comparison of all three through-connected information words $I^{(x)}$, as well as an evaluation of the co-transmitted parity bit P, occurs. In the case of a combination of a parity consistency and a recognized error in the bit-by-bit comparison, the timer procedure T commences. When a high error rate is identified after the expiration of the timer procedure T, (i.e., an error rate of, for instance, 9 over 10 frames) then a comparison of all three information words $I^{(x)}$ is implemented according to the principle of the majority decision. This principle of the majority decision is described in K. Steinbuch: Taschenbuch der Nachrichtenverarbeitung (Springer-Verlag, 1962). After identification of the error rates, the switching network level having an inadmissible error rate in comparison to the other two switching network levels can be recognized via the principle of the majority decision as the switching network level working with the faulty through-connection. Consequently, procedures for error treatment can be initiated in the identified malfunctioning switching network level after transmission of a message to the control computer CP.

The method of the present invention can also be effectively applied in a further embodiment to switching network components $SN_{(x-y)}$ viewed as sub-components of the switching network. FIG. 3 shows this embodiment. Checks with the through-connection errors can thus previously occur within the switching network SN. A parity bit is attached to each of the information words as check information in the present exemplary embodiment. Alternatively, some other check information could be attached to each of the information words.

FIGS. 4A and 4B provide a flowchart representation of the operation of the present invention. As illustrated, the above embodiments of the present invention are encompassed and described by the flowchart elements shown in FIGS. 4A and 4B.

Although I have described my invention by reference to particular illustrative embodiments thereof, many changes and modifications of the invention may become apparent to those skilled in the art: without departing from the spirit and scope of the invention. I therefore intend to include within the patent warranted hereon all such changes and modifications as may reasonably and properly be included within the scope of my contribution to the art.

I claim:

1. Method for error detection in a digital communication system, said communication system comprising a switching network having at least two switching network levels incorporated into said communication network via input side and output side interface elements, comprising the steps of:
    a) forming an information stream of information words from said input side of said communication network;
    b) providing said information words with a check information in the interface elements of the input side;
    c) replicating said information words to form a plurality of identical information words equal to the number of switching network levels;
    d) respectively transmitting said identical information words with said check information via at least two switching network levels from said input side interface elements to said output side interface elements, and thereby obtaining at least two received information words at said output side interface elements;
    e) comparing said received information words bit-by-bit in the interface elements of the output side;
    f) evaluating the co-transmitted check information of the respective received information word;
    g) if a difference between said received information words and a permanent identified consistency with respect to said co-transmitted check information occur simultaneously for a defined time span, implementing error monitoring;
    h) retaining said difference between said successive received information words for identifying an error rate; and
    i) outputting a message to a control means after expiration of said time span in case of a predetermined error rate.

2. A method according to claim 1, wherein a parity bit of the information word is used as a check information.

3. A method according to claim 1, wherein said switching networks have three switching network levels wherein a switching network level has an inadmissible error rate in comparison to said other two switching network levels, said method further comprises a step of recognizing said inadmissible error rate according to the principle of a majority decision.

4. A method according to claim 1, further comprising the steps of:
    i) identifying an inconsistency with respect to said check information of said information word with respect to said switching network level; and
    ii) aborting said error monitoring.

5. A method according to claim 4, wherein:
said control means responds to said message;
initiates means for aborting a connection; and
commences error detecting procedures.

6. A method according to claim 1, wherein said communication system has asynchronously set switching networks said method further comprising a step of waiting for a protective time characteristic of the duration of a setting event to transpire before commencing said error monitoring.

7. A method according to claim 6, wherein said method further comprises a step of implementing said method in at least one of said switching network levels in a multi-stage, redundant switching network.

* * * * *